(12) United States Patent
Matsumoto et al.

(10) Patent No.: US 11,683,116 B2
(45) Date of Patent: Jun. 20, 2023

(54) LIGHT AMPLIFICATION DEVICE, LIGHT TRANSMISSION SYSTEM, AND LIGHT AMPLIFICATION METHOD

(71) Applicant: NEC Corporation, Tokyo (JP)

(72) Inventors: Keiichi Matsumoto, Tokyo (JP); Kohei Hosokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/743,695

(22) Filed: May 13, 2022

(65) Prior Publication Data

US 2022/0376811 A1 Nov. 24, 2022

(30) Foreign Application Priority Data

May 19, 2021 (JP) .............................. JP2021-084297

(51) Int. Cl.
*H04B 10/00* (2013.01)
*H04J 14/02* (2006.01)
*H04B 10/294* (2013.01)
*H04J 14/00* (2006.01)

(52) U.S. Cl.
CPC ...... *H04J 14/0209* (2013.01); *H04B 10/2942* (2013.01)

(58) Field of Classification Search
CPC .. H04B 10/29; H04B 10/291; H04B 10/2912; H04B 10/293; H04B 10/294; H04B 10/296
See application file for complete search history.

(56) References Cited

U.S. PATENT DOCUMENTS

2006/0023298 A1   2/2006  Ohshima et al.
2007/0086779 A1*  4/2007  Stephens ............ H04B 10/2507
                                                        398/33

FOREIGN PATENT DOCUMENTS

JP        2006-066862 A       3/2006

* cited by examiner

*Primary Examiner* — Daniel G Dobson
(74) *Attorney, Agent, or Firm* — Sughrue Mion, PLLC

(57) ABSTRACT

A light amplification device according to an example aspect of the invention includes a wavelength demultiplexing unit configured to demultiplex the wavelength division multiplexed signal light into a plurality of wavelength bands; a plurality of light amplification media configured to amplify the plurality of pieces of demultiplexed multiplex signal light; a wavelength multiplexing unit configured to multiplex the amplified demultiplexed multiplex signal light; a plurality of excitation energy supply units configured to supply excitation energy to each of the plurality of light amplification media; and a control unit, wherein the control unit includes a wavelength multiplexing/demultiplexing control unit configured to control the wavelength demultiplexing unit and the wavelength multiplexing unit in such a way that a starting wavelength and a wavelength number become an optimum starting wavelength and an optimum wavelength number when a sum of power consumption of the plurality of excitation energy supply units is minimized.

20 Claims, 9 Drawing Sheets

LIGHT AMPLIFICATION DEVICE, LIGHT TRANSMISSION SYSTEM, AND LIGHT AMPLIFICATION METHOD

This application is based upon and claims the benefit of priority from Japanese Patent Application No. 2021-084297, filed on May 19, 2021, the disclosure of which is incorporated herein in its entirety by reference.

TECHNICAL FIELD

The present invention relates to a light amplification device, a light transmission system, and a light amplification method, and particularly, relates to a light amplification device, a light transmission system, and a light amplification method, which are for use in wavelength division multiplexing communication.

BACKGROUND ART

An optical fiber amplifier that amplifies a signal strength of an optical signal includes an amplifier that adopts a method of amplifying a signal strength of an optical signal by inputting excitation light, which is output from an excitation light source, to a rare earth-doped fiber that receives the optical signal. For example, there is known an optical fiber amplifier having a structure in which a core portion of an optical fiber is doped with erbium (Er) as an example of a rare earth element.

An optical fiber amplifier being used in the 1.55 micrometer (μm) band being a low-loss wavelength band in the optical fiber communication has a structure in which a core portion of the optical fiber as mentioned above is doped with erbium. Erbium ions in the optical fiber are activated by excitation light in the 0.98 μm or 1.48 μm band, and laser transition in the 1.55 μm band, in erbium, is used. According to such an optical fiber amplifier, signal light in the 1.55 μm band may be amplified by excitation using a semiconductor laser diode.

An optical fiber amplifier has high efficiency and high gain, in which the gain hardly depends on polarized waves. Accordingly, the optical fiber amplifier is used as an amplifier for relaying optical signals in an optical fiber communication system. The optical fiber communication system adopts a wavelength division multiplexing (WDM) transmission technology of multiplexing a plurality of wavelengths in order to enable large-capacity communication, in which the amplifier amplifies pieces of signal light in all channels collectively.

However, in an optical fiber transmission relay system that transmits wavelength division multiplexed signal light, a gain of an optical amplifier varies with respect to each wavelength, and therefore, a strength of the optical signal differs between wavelengths. Accordingly, there is known a light amplification device that incorporates therein a light gain equalization filter for reducing a gain deviation of the optical signal (for example, refer to Japanese Unexamined Patent Application Publication No. 2006-066862). In such a related light amplification device, when a gain deviation occurs in an output of an optical repeater, the gain deviation caused in the optical amplifier is equalized by the light gain equalization filter in order to be adjusted to a state in which good transmission quality is achieved.

SUMMARY

An example object of the invention is to provide a light amplification device, a light transmission system, and a light amplification method that solve the above-mentioned problem that, in a case of amplifying wavelength division multiplexed signal light by using an optical amplifier, reduction of wavelength dependency of a signal gain leads to increased inefficiency in use of power supply resources.

A light amplification device according to an example aspect of the invention includes: a wavelength demultiplexing unit configured to receive wavelength division multiplexed signal light including a plurality of pieces of signal light different in wavelength, demultiplex the wavelength division multiplexed signal light into a plurality of wavelength bands, and output a plurality of pieces of demultiplexed multiplex signal light; a plurality of light amplification media configured to amplify each of the plurality of pieces of demultiplexed multiplex signal light, and output each of a plurality of pieces of amplified demultiplexed multiplex signal light; a wavelength multiplexing unit configured to multiplex and output the amplified demultiplexed multiplex signal light; a plurality of excitation energy supply units configured to supply excitation energy to each of the plurality of light amplification media; and a control unit, wherein the control unit includes a wavelength multiplexing/demultiplexing control unit configured to control the wavelength demultiplexing unit and the wavelength multiplexing unit in such a way that a starting wavelength serving as a starting point of the wavelength band and a wavelength number being a number of pieces of the signal light included in the wavelength band become an optimum starting wavelength and an optimum wavelength number that are the starting wavelength and the wavelength number when a sum of power consumption of the plurality of excitation energy supply units is minimized.

A light transmission system according to an example aspect of the invention includes: a light relay device including a light amplification device, and a network management device, wherein the light amplification device includes a wavelength demultiplexing unit configured to receive wavelength division multiplexed signal light including a plurality of pieces of signal light different in wavelength, demultiplex the wavelength division multiplexed signal light into a plurality of wavelength bands, and output a plurality of pieces of demultiplexed multiplex signal light; a plurality of light amplification media configured to amplify each of the plurality of pieces of demultiplexed multiplex signal light, and output each of a plurality of pieces of amplified demultiplexed multiplex signal light; a wavelength multiplexing unit configured to multiplex and output the amplified demultiplexed multiplex signal light; a plurality of excitation energy supply units configured to supply excitation energy to each of the plurality of light amplification media; and a control unit, the control unit includes a wavelength multiplexing/demultiplexing control unit configured to control the wavelength demultiplexing unit and the wavelength multiplexing unit in such a way that a starting wavelength serving as a starting point of the wavelength band and a wavelength number being a number of pieces of the signal light included in the wavelength band become an optimum starting wavelength and an optimum wavelength number that are the starting wavelength and the wavelength number when a sum of power consumption of the plurality of excitation energy supply units is minimized, and the network management device manages the plurality of pieces of signal light constituting the wavelength division multiplexed signal light in such a way that the pieces of signal light with a same modulation multi-level number are included in a same wavelength band.

A light amplification method according to an example aspect of the invention includes: receiving wavelength division multiplexed signal light including a plurality of pieces of signal light different in wavelength, demultiplexing the wavelength division multiplexed signal light into a plurality of wavelength bands, and generating a plurality of pieces of demultiplexed multiplex signal light; amplifying each of the plurality of pieces of demultiplexed multiplex signal light by a plurality of light amplification media, and generating each of a plurality of pieces of amplified demultiplexed multiplex signal light; multiplexing the amplified demultiplexed multiplex signal light; supplying excitation energy to each of the plurality of light amplification media; and demultiplexing the wavelength division multiplexed signal light into a plurality of wavelength bands in such a way that a starting wavelength serving as a starting point of the wavelength band and a wavelength number being the number of pieces of the signal light included in the wavelength band become an optimum starting wavelength and an optimum wavelength number that are the starting wavelength and the wavelength number when a sum of power consumption during generation of excitation energy is minimized.

BRIEF DESCRIPTION OF THE DRAWINGS

Exemplary features and advantages of the present invention will become apparent from the following detailed description when taken with the accompanying drawings in which.

EXAMPLE EMBODIMENT

Example embodiments according to the present invention will be described below with reference to the drawings.

First Example Embodiment

Figure 1:
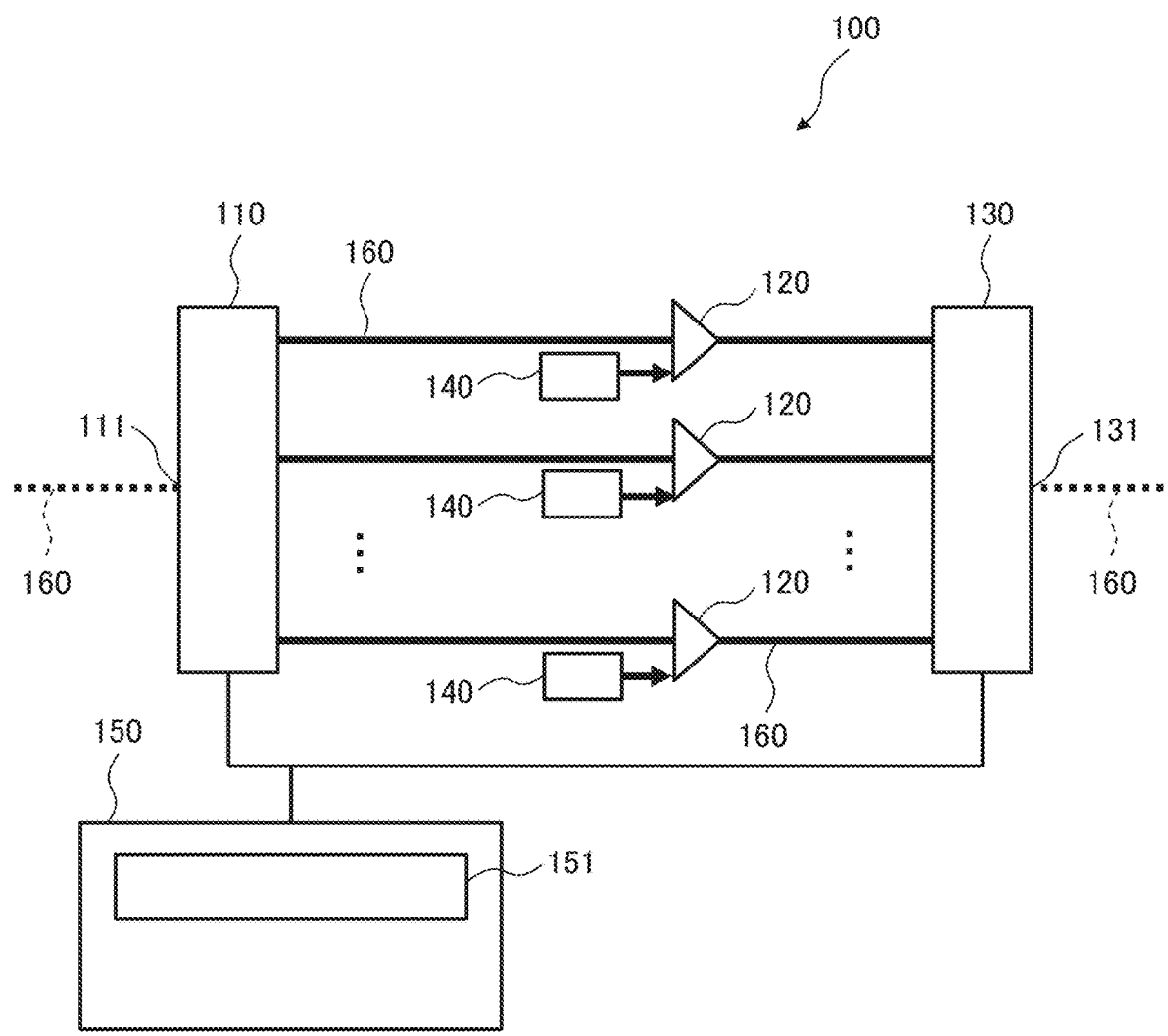
FIG. 1 is a block diagram illustrating a configuration of a light amplification device according to a first example embodiment of the present invention.

FIG. 1 is a block diagram illustrating a configuration of a light amplification device 100 according to a first example embodiment of the present invention. The light amplification device 100 includes a wavelength demultiplexing unit 110, a plurality of light amplification media 120, a wavelength multiplexing unit 130, a plurality of excitation energy supply units 140, and a control unit 150.

The wavelength demultiplexing unit 110 receives wavelength division multiplexed signal light including a plurality of pieces of signal light different in wavelength, demultiplexer the wavelength division multiplexed signal light into a plurality of wavelength bands, and outputs a plurality of pieces of demultiplexed multiplex signal light. The plurality of light amplification media 120 amplify the plurality of pieces of demultiplexed multiplex signal light, and output amplified demultiplexed multiplex signal light. The wavelength multiplexing unit 130 multiplexes and outputs the amplified demultiplexed multiplex signal light. The plurality of excitation energy supply units 140 supply excitation energy to the plurality of light amplification media 120.

The control unit 150 includes a wavelength multiplexing/demultiplexing control unit 151 that controls the wavelength demultiplexing unit 110 and the wavelength multiplexing unit 130. The wavelength multiplexing/demultiplexing control unit 151 controls the wavelength demultiplexing unit 110 and the wavelength multiplexing unit 130 in such a way that starting wavelengths serving as starting points of wavelength bands and wavelength numbers each of which is the number of signal light included in the wavelength band become an optimum starting wavelength and an optimum wavelength number. Herein, the optimum starting wavelength and the optimum wavelength number are a starting wavelength and a wavelength number when the sum of power consumptions of the plurality of excitation energy supply units 140 is minimized.

As described above, the light amplification device 100 according to the present example embodiment is configured to demultiplex the wavelength division multiplexed signal light into the plurality of wavelength bands and amplify the plurality of pieces of demultiplexed multiplex signal light at the optimum starting wavelength and the optimum wavelength number at which the sum of power consumptions of the plurality of excitation energy supply units 140 is minimized. Therefore, according to the light amplification device 100 of the present example embodiment, in the case of amplifying the wavelength division multiplexed signal light by using an optical amplifier, wavelength dependency of a signal gain can be reduced while increasing utilization efficiency of power supply resources.

Each of the plurality of light amplification media 120 includes a single-core optical fiber, which may be configured to include a rare earth element in a core portion. When the wavelength band of the wavelength division multiplexed signal light is the 1.55 μm band, erbium (Er) may be typically used as the rare earth element. Specifically, the light amplification media 120 may be single-core erbium doped optical fibers (SC-EDF). In this case, the wavelength demultiplexing unit 110, the plurality of light amplification media 120 and the wavelength multiplexing unit 130 may be coupled to one another by using single-mode optical fibers 160. The wavelength demultiplexing unit 110 includes an input port 111 to which the single-mode optical fiber 160 is connected, and the wavelength multiplexing unit 130 includes an output port 131 to which the single-mode optical fiber 160 is connected.

As each of the wavelength demultiplexing unit 110 and the wavelength multiplexing unit 130, typically, one of a wavelength selective switch (WSS) and an arrayed-waveguide grating (AWG) may be used. The wavelength selective switch (WSS) has a port switch function to connect to an output port different for each wavelength, an attenuation function to adjust a light intensity level with respect to each wavelength, a wavelength multiplexing function, and a wavelength separating function.

Each of the excitation energy supply units 140 typically includes a semiconductor laser. When the wavelength band of the wavelength division multiplexed signal light is the 1.55 µm band, a semiconductor laser that outputs laser light in the 0.98 µm band or the 1.48 µm band may be used as the excitation energy supply unit 140.

Figure 2:
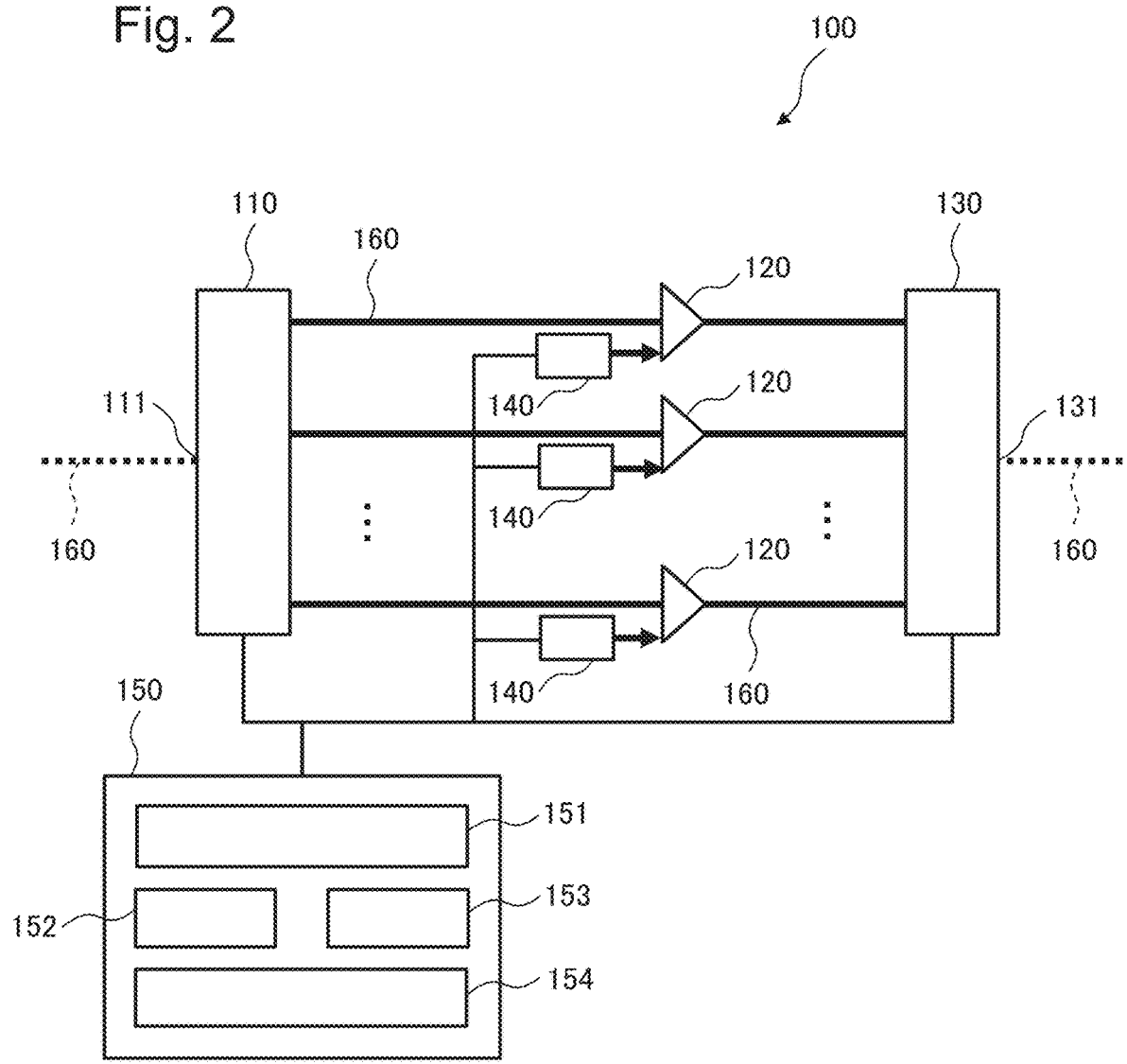
FIG. 2 is a block diagram illustrating the configuration of the light amplification device according to the first example embodiment of the present invention.

As illustrated in FIG. 2, the control unit 150 may be configured to include a lookup table 152, a minimum power calculating unit 153, and an excitation energy control unit 154. For each modulation multi-level number of the signal light and each of the wavelength numbers, the lookup table 152 stores a relationship between the starting wavelength and power consumption of the excitation energy supply unit 140, which is necessary at the time of amplifying the demultiplexed multiplex signal light while causing the same to meet a required optical signal-to-noise ratio. The minimum power calculating unit 153 calculates the optimum starting wavelength and the optimum wavelength number by referring to the lookup table 152. The excitation energy control unit 154 controls outputs of the excitation energy supply units 140.

Herein, the light amplification device 100 may be configured to include a gain monitor unit (not illustrated) with respect to each of the plurality of light amplification media 120. The gain monitor unit measures input light power of the demultiplexed multiplex signal light input to the light amplification medium 120 and output light power of the amplified demultiplexed multiplex signal light output from the light amplification medium 120, and calculates a measured gain value, which is a gain of the light amplification medium 120, from the input light power and the output light power. In this case, the excitation energy control unit 154 is able to control the excitation energy supply unit 140 in such a way that the measured gain value is a gain value necessary for meeting an optical signal-to-noise ratio required for signal light with a wavelength in which the gain of the light amplification medium 120 is the minimum among the plurality of pieces of signal light.

Figure 3:
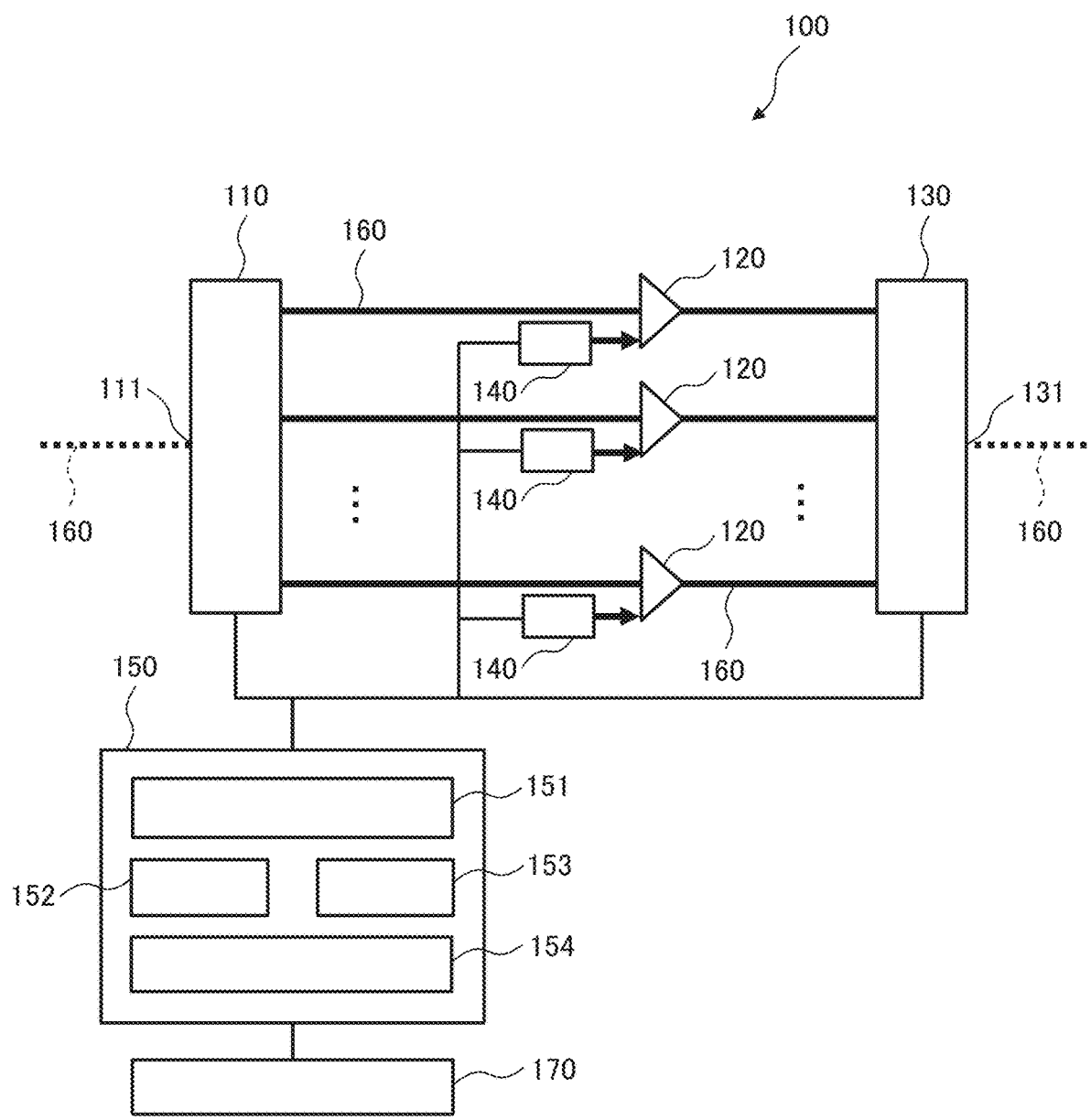
FIG. 3 is a block diagram illustrating the configuration of the light amplification device according to the first example embodiment of the present invention.

As illustrated in FIG. 3, the light amplification device 100 may further include an information acquisition unit 170. The information acquisition unit 170 acquires multiplexed signal light information including multiplexed signal light starting wavelengths serving as starting points of the wavelength bands of the wavelength division multiplexed signal light, multiplexed signal light wavelength numbers each of which is the number of wavelengths of the plurality of pieces of signal light, and an optical signal-to-noise ratio required for each of the plurality of pieces of signal light. The information acquisition unit 170 acquires the multiplexed signal light information, for example, from a network management device of a light transmission system. Then, the information acquisition unit 170 notifies the control unit 150 of the multiplexed signal light information. In this case, the control unit 150 calculates the optimum starting wavelength and the optimum wavelength number, based on the multiplexed signal light information.

Figure 4:
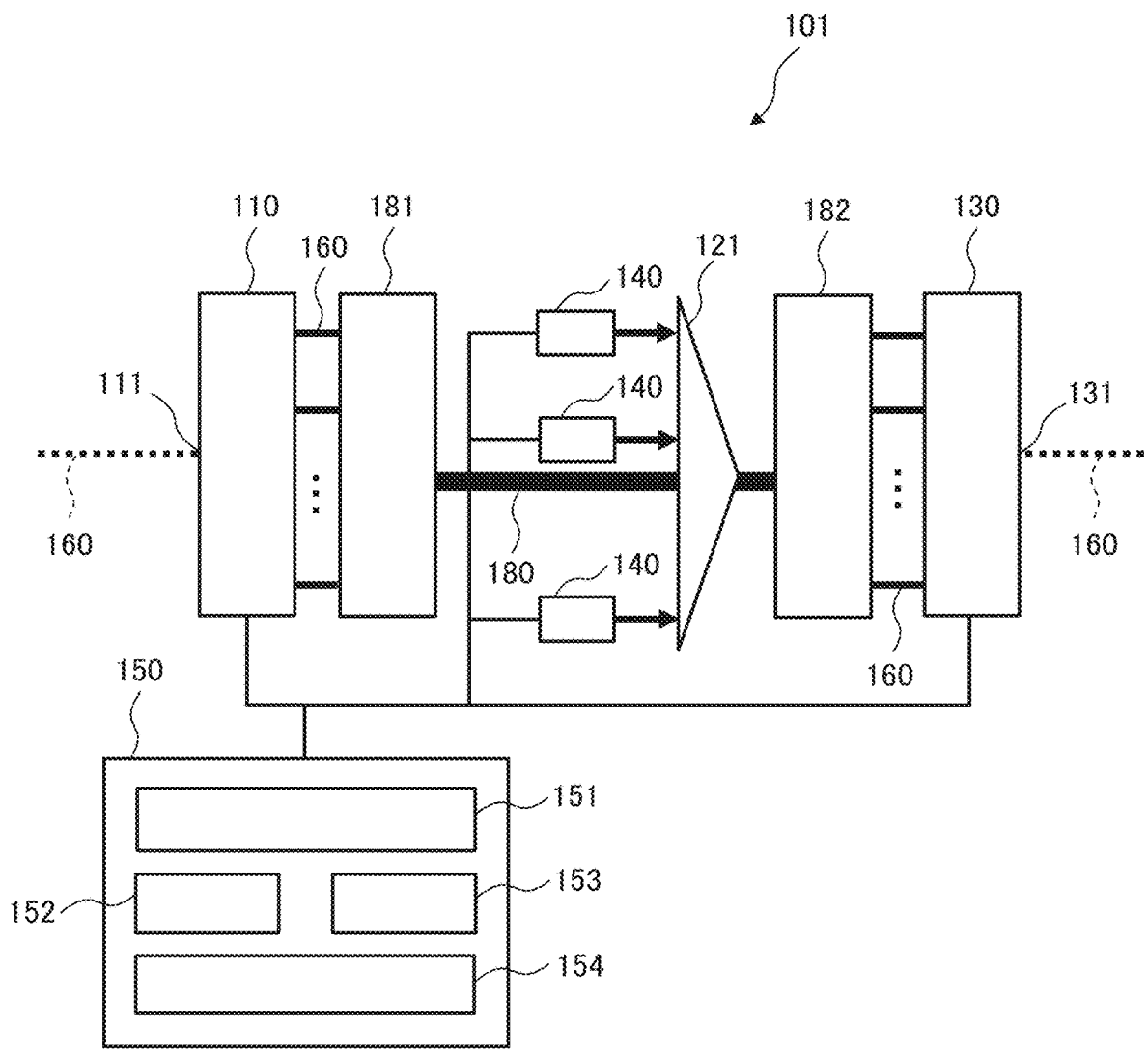
FIG. 4 is a block diagram illustrating another configuration of the light amplification device according to the first example embodiment of the present invention.

In the above description, each of the plurality of light amplification media 120 is configured to include the single-core optical fiber. However, the configuration is not limited to the above and the plurality of light amplification media 120 may be configured to include a multi-core optical fiber in which a plurality of core portions are individually doped with a rare earth element, as in a light amplification device 101 illustrated in FIG. 4. Specifically, as the plurality of light amplification media, one multi-core erbium doped optical fiber (MC-EDF) 121 may be used in place of the plurality of single-core erbium doped optical fibers.

In this case, the light amplification device 101 has a configuration in which a multi-core optical fiber 180, a fan-out 181, and a fan-in 182 are inserted before and after the multi-core erbium doped optical fiber 121. The multi-core optical fiber 180, which is one optical fiber, includes a plurality of cores, each of which independently propagates signal light. The fan-out 181 couples pieces of the signal light, which propagate through the plurality of single-mode optical fibers 160, to the plurality of cores of the one multi-core optical fiber 180. The fan-in 182 couples the pieces of signal light, which propagate through the plurality of cores of the one multi-core optical fiber 180, to the plurality of single-mode optical fibers 160.

In the light amplification device 101, the excitation energy supply units 140 supply excitation energy to the plurality of cores of the multi-core erbium doped optical fiber 121. In this case, each of the above-mentioned gain monitor units (not illustrated) may be configured to measure output light power of each of the cores branched from the single-mode optical fibers 160 which connect the fan-in 182 and the wavelength multiplexing unit 130 to each other.

Next, operations of the light amplification device 100 (101) according to the present example embodiment will be described.

As mentioned above, the information acquisition unit 170 provided in the light amplification device 100 acquires the multiplexed signal light information, for example, from the network management device of the light transmission system. The multiplexed signal light information includes the multiplexed signal light starting wavelength and the multiplexed signal light wavelength number with respect to each modulation multi-level number of the signal light included in the wavelength division multiplexed signal light, and the optical signal-to-noise ratio required for the signal light. The information acquisition unit 170 notifies the control unit 150 of the multiplexed signal light information.

By the wavelength multiplexing/demultiplexing control unit 151, the control unit 150 controls the wavelength demultiplexing unit 110 and the wavelength multiplexing unit 130 to acquire the starting wavelength (optimum starting wavelength) and the wavelength number (optimum wavelength number) in the case where the sum of power consumption of the plurality of excitation energy supply units 140 is minimized. At this time, the minimum power calculating unit 153 provided in the control unit 150 calculates the optimum starting wavelength and the optimum wavelength number by referring to the lookup table 152.

Figure 5:
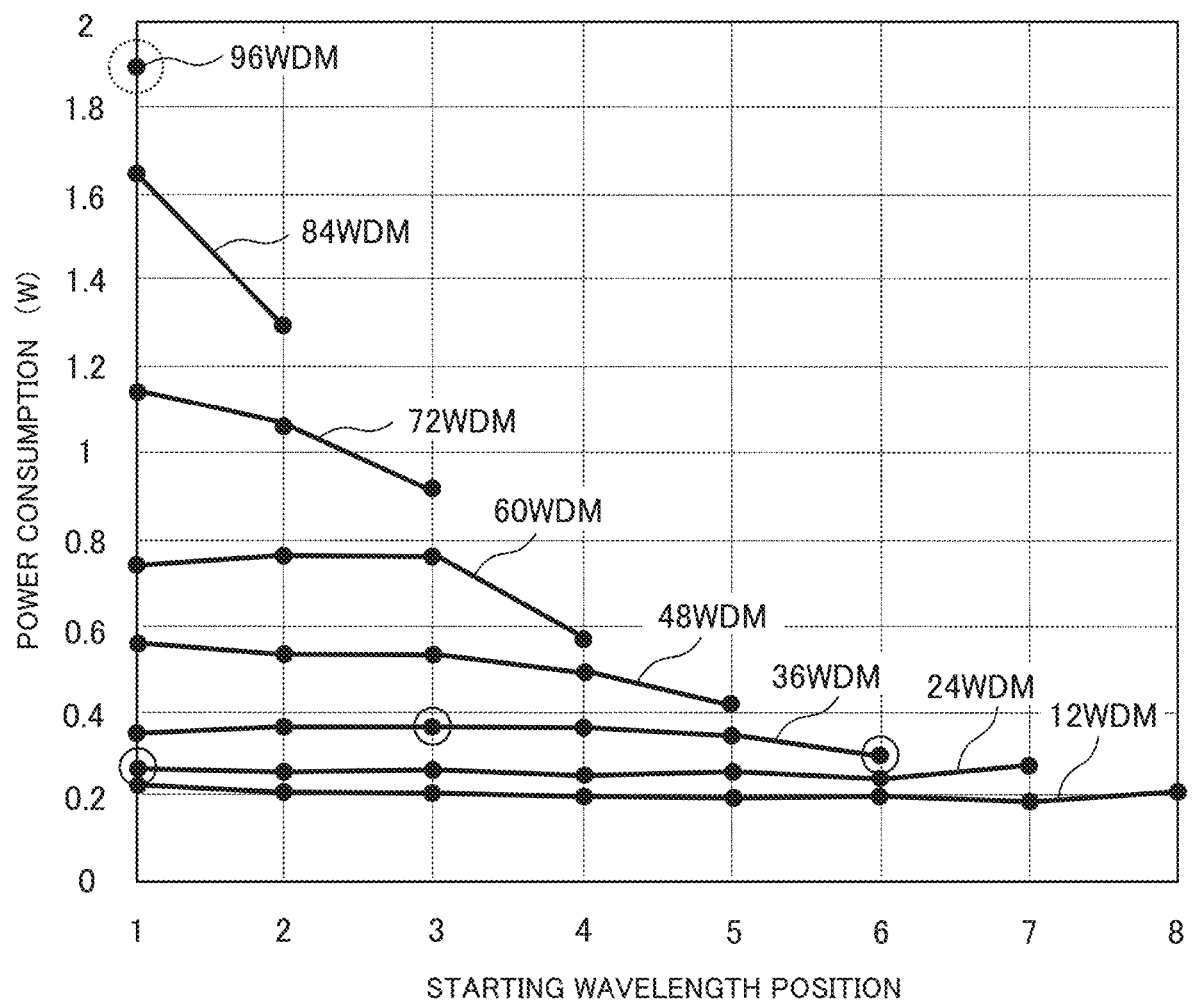
FIG. 5 is a diagram illustrating one example of a lookup table provided in a control unit of the light amplification device according to the first example embodiment of the present invention.

For each modulation multi-level number of the signal light and each of the wavelength numbers, the lookup table 152 stores the relationship between the starting wavelength and the power consumption of the excitation energy supply unit 140, which is necessary at the time of amplifying the demultiplexed multiplex signal light while causing the same to meet the required optical signal-to-noise ratio. FIG. 5 illustrates an example of the lookup table 152.

Figure 6:
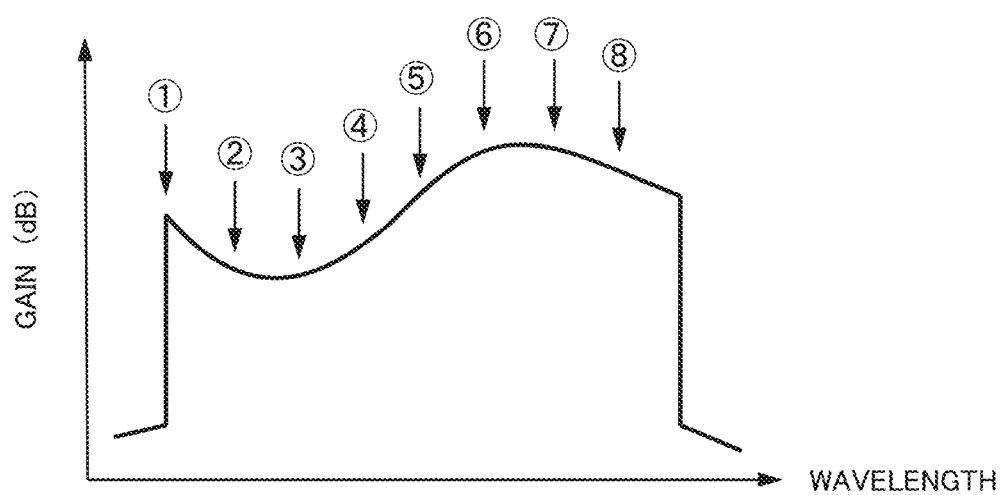
FIG. 6 is a diagram illustrating one example of a gain spectrum of a light amplification medium provided in the light amplification device according to the first example embodiment of the present invention.

In FIG. 5, a vertical axis represents the above-mentioned power consumption, and a horizontal axis represents positions of the starting wavelengths serving as starting points of the wavelength bands when the wavelength division multiplexed signal light is demultiplexed into the plurality of wavelength bands. Starting wavelength positions in the horizontal axis correspond to wavelength positions ("1" to "8") in a gain spectrum of a light amplification medium illustrated in FIG. 6. Numbers in FIG. 5 indicate wavelength numbers of pieces of the signal light, and for example, "60WDM" represents a case of wavelength division multiplexed signal light in which a wavelength number is 60. FIG. 5 illustrates an example where the modulation multi-level numbers of the pieces of signal light are the same in the entire band. Herein, the modulation multi-level numbers are determined by a modulation method of the signal light, and the modulation method is, for example, 8 quadrature amplitude modulation (8QAM).

As seen from FIG. 5, the power consumption varies depending on the starting wavelength positions. This is caused by the fact that, in the gain spectrum of the light amplification medium, the gain is larger and a light amplification factor is larger on a longer wavelength side (for example, see FIG. 6). For example, in the case of amplifying wavelength division multiplexed signal light with a wavelength number of 60 (60WDM), "4" as a starting wavelength position is located on a longer wavelength side of an amplification band than "3" as a starting wavelength position, and accordingly, a light amplification factor there is increased. Therefore, in the case where the starting wavelength position is "4, a desired light output strength can be achieved with less power consumption. Hence, the "power consumption" tends to decrease as the "starting wavelength position" is located on the longer wavelength side.

Referring to the lookup table 152, the minimum power calculating unit 153 calculates the number of bands as demultiplexing results from the wavelength division multiplexed signal light (96WDM), and calculates the wavelength number assigned per band, both of which minimize the total power consumption of each excitation energy supply unit 140. In this case, the minimum power calculating unit 153 may be configured to calculate the number of bands and the wavelength numbers by considering combinations in a round-robin manner.

The above will be specifically described by an example of the lookup table 152 illustrated in FIG. 5. Broken-line circles in FIG. 5 each indicate power consumption when the wavelength division multiplexed signal light is not divided. Herein, the case of the wavelength division multiplexed signal light (96WDM) in which the multiplexed signal light wavelength number is 96 is described as an example. Each of the circles indicates each power consumption in the case of dividing the wavelength division multiplexed signal light (96WDM) with the multiplexed signal light wave number of 96, and indicates the combination that minimizes the total power consumption. Herein, as an example, indicated are power consumptions when the wavelength division multiplexed signal light is divided into three, which are wavelength division multiplexed signal light in which the starting wavelength position is "1" and the wavelength number is 24 (hereinafter, described as "24WDM" and the like), 36WDM in which the starting wavelength position is "3", and 36WDM in which the starting wavelength position is "6."

As described above, according to the light amplification device 100 of the present example embodiment, the wavelength division multiplexed signal light is demultiplexed, for example, into optical signals in wavelength bands with larger light amplification factors and optical signals in wavelength bands with smaller light amplification factors by using a light amplification medium having characteristics in which a gain differs for each wavelength, and thereafter, the optical signals can be individually amplified by the plurality of light amplification media 120. Therefore, the light amplification factor does not become too high or too low with respect to each wavelength band, and the optical signals can be amplified by appropriate light amplification factors. Specifically, according to the light amplification device 100 of the present example embodiment, in the case of amplifying the wavelength division multiplexed signal light by using the optical amplifier, the wavelength dependency of the signal gain can be reduced while increasing the utilization efficiency of the power supply resources.

Figure 7:
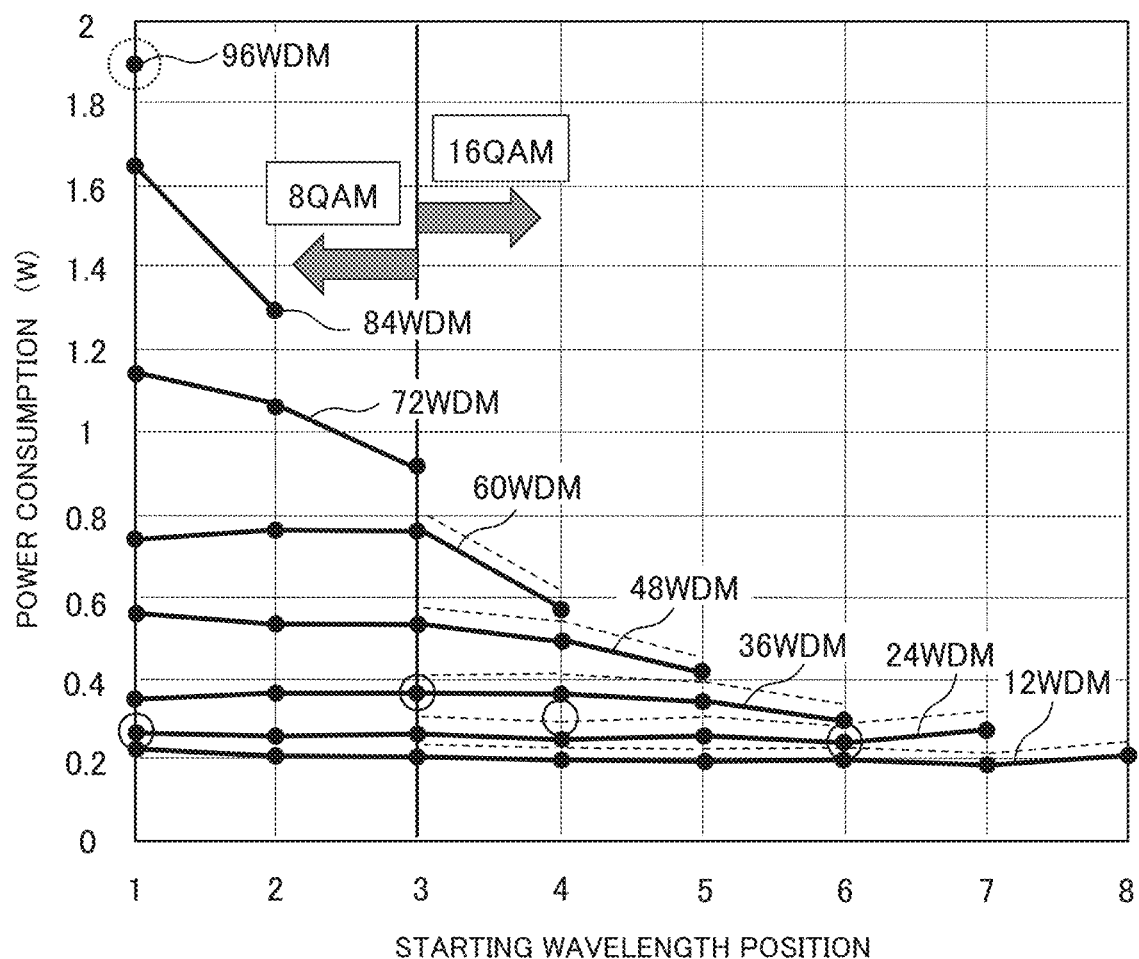
FIG. 7 is a diagram illustrating another example of the lookup table provided in the control unit of the light amplification device according to the first example embodiment of the present invention.

FIG. 5 illustrates such an example where the modulation multi-level numbers of the pieces of signal light are the same (8QAM for example) in the entire band. Usage of the light amplification device 100 according to the present embodiment is not limited to above, and may be used in a case where the modulation multi-level numbers of the pieces of signal light differ depending on the wavelength bands. FIG. 7 illustrates an example of the lookup table 152 in such a case.

In FIG. 7, solid lines are the same as those in FIG. 5, and each indicate a relationship between the starting wavelength and power consumption of the excitation energy supply unit 140 when the modulation method of the signal light is 8QAM, for example. Meanwhile, broken lines each indicate a relationship between the starting wavelength and power consumption of the excitation energy supply unit 140 in the case of signal light with a modulation multi-level number larger than 8QAM, for example, when the modulation method is 16QAM.

In the example illustrated in FIG. 7, pieces of 8QAM signal light with small modulation multi-level numbers are arranged on the starting wavelength position "1" side, that is, in a wavelength band in which the amplification factors of the light amplification media 120 are smaller. Pieces of 16QAM signal light with larger modulation multi-level numbers are arranged on the starting wavelength position "8" side, that is, in a wavelength band in which the amplification factors of the light amplification media 120 are larger. In such a case, the control unit 150 may be configured to control the wavelength demultiplexing unit 110 and the wavelength multiplexing unit 130 to divide the wavelength division multiplexed signal light into the wavelength bands in which the pieces of 8QAM signal light are arranged and into the wavelength bands in which the pieces of 16QAM signal light are arranged.

With such a configuration, the power consumption of the excitation energy supply unit 140 can be reduced. The reason for this will be described below.

As in such 16QAM signal light and such 8QAM signal light, when the pieces of signal light with different modulation multi-level numbers are mixed and wavelength-multiplexed, the signals of the (16QAM) signal light with larger modulation multi-level numbers require larger optical signal-to-noise ratios, and therefore, also require larger light amplification gains. Hence, the pieces of signal light with such larger modulation multi-level numbers are optically amplified in such a way as to meet a desired gain in order to keep signal quality thereof. At this time, the pieces of (8QAM) signal light with smaller modulation multi-level numbers, which are mixed in the wavelength division multiplexed signal light, only desire smaller gains than the pieces of signal light with larger modulation multi-level numbers, but are optically amplified in such a way that the pieces of signal light with larger modulation multi-level numbers meet the desired gain. Accordingly, the pieces of signal light with smaller modulation multi-level numbers are amplified excessively. Hence, excitation energy for use in the excessive amplification leads to a loss, which reduces the utilization efficiency of the power supply resources. However, according to the light amplification device 100 of the present example embodiment, the wavelength division multiplexed signal light is divided into the wavelength bands in which the pieces of 8QAM signal light are arranged and into the wavelength bands in which the pieces of 16QAM signal light are arranged, and the pieces of signal light, which belong to the wavelength bands, are each amplified by the plurality of light amplification media 120. As a result, the above-mentioned loss of the excitation energy can be reduced, and the power consumption of the excitation energy supply unit 140 can be reduced.

In the above description, an example is described where the control unit 150 controls the wavelength demultiplexing unit 110 and the wavelength multiplexing unit 130 to divide the wavelength division multiplexed signal light into the wavelength bands in which the pieces of 8QAM signal light are arranged and into the wavelength bands in which the pieces of 16QAM signal light are arranged. However, the configuration is not limited to the above and the control unit 150 may be configured to perform the control to minimize the total power consumption of each excitation energy supply unit 140 in each of the wavelength bands in which the pieces of 8QAM signal light are arranged and of the wavelength bands in which the pieces of 16QAM signal light are arranged. The reason for this is that, since the required optical signal-to-noise ratio changes when the modulation method is changed from 8QAM to 16QAM, the necessary gain level changes in the wavelength bands in which the pieces of 16QAM signal light are arranged, and optimum states of the starting wavelengths and the wavelength numbers change. Specifically, the control unit 150 may be configured to calculate the optimum starting wavelength and the optimum wavelength number, which minimize the total power consumption, in each of the wavelength bands, and to control the wavelength demultiplexing unit 110 and the wavelength multiplexing unit 130 to achieve the calculated optimum starting wavelength and the calculated optimum wavelength number.

As mentioned above, when the modulation multi-level numbers of the pieces of signal light are the same (8QAM) in the entire band, the total power consumption is minimized in the case where the wavelength division multiplexed signal light is divided into three, which are 24WDM with a starting wavelength position of "1", 36WDM with a starting wavelength position of "3", and 36WDM with a starting wavelength position of "6" (see FIG. 5). In contrast, when the pieces of 16QAM signal light are arranged in a part of the wavelength bands of the signal light, a combination in which the total power consumption is minimized becomes one, for example, as indicated by circles in FIG. 7. Specifically, the total power consumption is minimized in the case where the wavelength division multiplexed signal light is divided into four, which are 24WDM with a starting wavelength position of "1", 36WDM with a starting wavelength position of "3", 24WDM with a starting wavelength position of "4", and 12WDM with a starting wavelength position of "6".

Next, a light amplification method according to the present example embodiment will be described.

In the light amplification method according to the present example embodiment, first, wavelength division multiplexed signal light including a plurality of pieces of signal light different in wavelength is received, the wavelength division multiplexed signal light is demultiplexed into a plurality of wavelength bands, and a plurality of pieces of demultiplexed multiplex signal light are generated. The plurality of pieces of demultiplexed multiplex signal light are amplified by a plurality of light amplification media, and a plurality of pieces of amplified demultiplexed multiplex signal light are generated. Then, the plurality of pieces of amplified demultiplexed multiplex signal light are multiplexed. Further, excitation energy is supplied to each of the plurality of light amplification media. Herein, the wavelength division multiplexed signal light is demultiplexed into the plurality of wavelength bands in such a way that starting wavelengths serving as starting points of the wavelength bands and the wavelength numbers each of which is the number of signal light included in the wavelength band become an optimum starting wavelength and an optimum wavelength number. The optimum starting wavelength and the optimum wavelength number are a starting wavelength and a wavelength number when the sum of power consumption during generation of excitation energy is minimized.

At the time of demultiplexing the wavelength division multiplexed signal light into the above-mentioned plurality of wavelength bands, the optimum starting wavelength and the optimum wavelength number may be calculated with reference to the lookup table. Herein, with respect to each modulation multi-level number of the signal light and each of the wavelength numbers, the lookup table stores the relationship between the starting wavelength and the power consumption during generation of the excitation energy necessary for amplifying the demultiplexed multiplex signal light while causing the same to meet the required optical signal-to-noise ratio.

Further, the input light power of the demultiplexed multiplex signal light input to the light amplification medium and the output light power of the amplified demultiplexed multiplex signal light output from the light amplification medium may be measured, and the measured gain value, which is a gain of the light amplification medium, may be calculated from the input light power and the output light power. Then, a configuration may be adopted to generate the excitation energy in such a way that this measured gain value is a gain value necessary for meeting the optical signal-to-noise ratio required for the signal light with the wavelength in which the gain of the light amplification medium is the minimum among the plurality of pieces of signal light.

Moreover, the multiplexed signal light information may be acquired, which includes the multiplexed signal light starting wavelengths serving as starting points of the wavelength bands of the wavelength division multiplexed signal light, the multiplexed signal light wavelength numbers each of which is the number of wavelengths of the plurality of pieces of signal light, and the optical signal-to-noise ratio required for each of the plurality of pieces of signal light. In this case, a configuration can be adopted to calculate the optimum starting wavelength and the optimum wavelength number, based on this multiplexed signal light information.

As described above, according to the light amplification devices 100 and 101 and the light amplification method of the present embodiment, in the case of amplifying the wavelength division multiplexed signal light by using the optical amplifier, the wavelength dependency of the signal gain may be reduced while increasing the utilization efficiency of the power supply resources.

Second Example Embodiment

Figure 8:
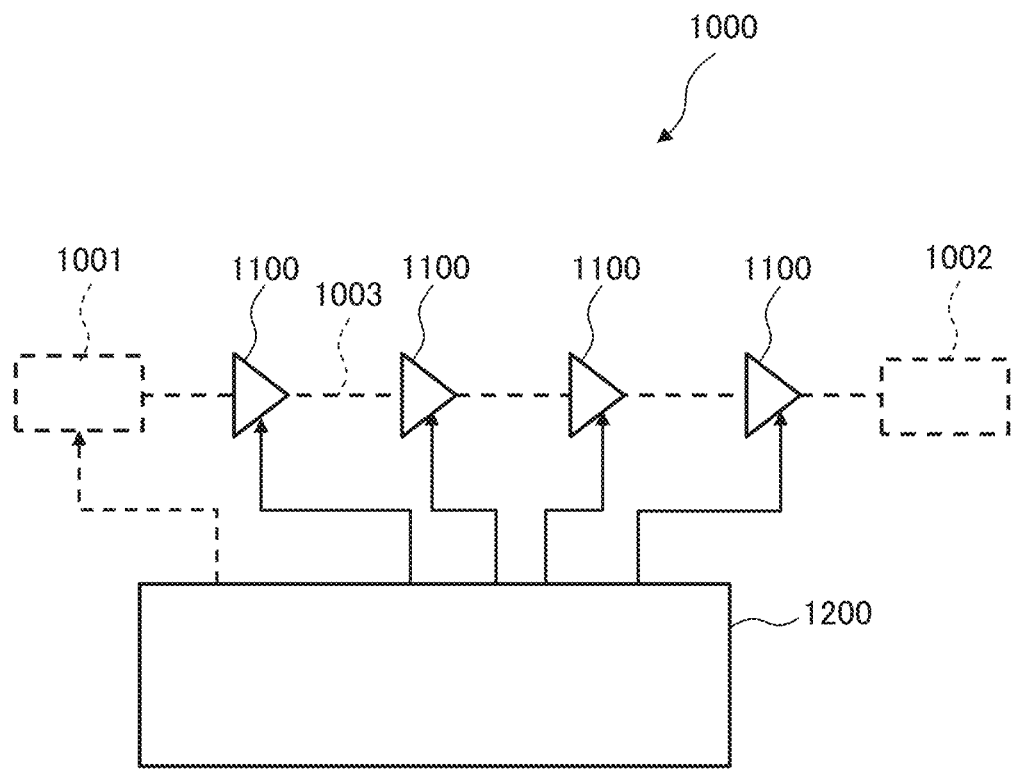
FIG. 8 is a block diagram illustrating a configuration of a light transmission system according to a second example embodiment of the present invention.

Next, a second example embodiment according to the present invention will be described. FIG. 8 illustrates a configuration of a light transmission system 1000 according to the present example embodiment. The light transmission system 1000 has light relay devices 1100 and a network management device 1200. Specifically, as illustrated in FIG. 8, the light transmission system 1000 includes the light relay devices 1100 inserted into a transmitting optical fiber 1003 that connects a first terminal station 1001 and a second terminal station 1002 to each other, and is controlled by the network management device 1200.

Each of the light relay devices 1100 includes the light amplification device 100 (101) according to the first example embodiment. The light amplification device 100 (101) amplifies an optical signal that propagates through the transmitting optical fiber 1003.

The network management device 1200 determines a modulation multi-level number of wavelength division multiplexed signal light in each wavelength band, the wavelength division multiplexed signal light being transmitted from the first terminal station 1001. Then, the network management device 1200 generates multiplexed signal light information with respect to each modulation multi-level number, and notifies the light amplification device, which is provided in the light relay device 1100, of the multiplexed signal light information with respect to each modulation multi-level number. Herein, the multiplexed signal light information includes multiplexed signal light starting wavelengths serving as starting points of the wavelength bands of the wavelength division multiplexed signal light, multiplexed signal light wavelength numbers each of which is the number of wavelengths of the plurality of pieces of signal light, and an optical signal-to-noise ratio required for each of the plurality of pieces of signal light.

At this time, the network management device 1200 manages the plurality of pieces of signal light, which constitute the wavelength division multiplexed signal light, in such a way that pieces of signal light with the same modulation multi-level number are included in the same wavelength band. Then, the network management device 1200 controls the first terminal station 1001 to transmit the pieces of signal light with the same modulation multi-level number by the same wavelength band.

Further, the network management device 1200 may be configured to assign signal light with a larger modulation multi-level number to a wavelength band with a larger gain of the light amplification medium provided in the light amplification device, and to assign signal light with a smaller modulation multi-level number to a wavelength band with a smaller gain of the light amplification medium provided therein.

In general, in the light transmission system 1000, a plurality of the light relay devices 1100 are inserted into a single transmitting optical fiber 1003. In this case, a configuration may be adopted in which multiplexing/demultiplexing ratios of the wavelength demultiplexing units and the wavelength multiplexing units in the light amplification devices provided in the plurality of light relay devices 1100 are the same in the plurality of light relay devices 1100. The configuration is not limited to the above, and may be a configuration in which the multiplexing/demultiplexing ratios of the wavelength demultiplexing units and the wavelength multiplexing units are different from one another in the plurality of light relay devices 1100.

As mentioned above, the light relay devices 1100 of the light transmission system 1000 according to the present example embodiment include the light amplification devices 100 (101) according to the first example embodiment. Herein, each of the light amplification devices 100 (101) is configured to demultiplex the wavelength division multiplexed signal light into the plurality of wavelength bands and amplify the plurality of pieces of demultiplexed multiplex signal light at the optimum starting wavelength and the optimum wavelength number at which the sum of power consumption of the plurality of excitation energy supply units 140 is minimized. Therefore, according to the light transmission system 1000 of the present example embodiment, in the case of amplifying the wavelength division multiplexed signal light by using the optical amplifier, the wavelength dependency of the signal gain may be reduced while increasing the utilization efficiency of the power supply resources.

In the optical fiber amplifier, the signal gains vary largely between the wavelengths when a wavelength filling factor of the wavelength division multiplexed (WDM) signal light made incident from the transmitting optical fiber increases. Therefore, in the above-mentioned related light amplification device, the optical amplifier is set in such a way that the signal light is optically amplified in such a way as to meet gains exceeding a desired gain even in the wavelength with the lowest signal gain, and the signal light in the excessively amplified wavelength bands is attenuated by a subsequent gain equalizer.

Figure 9:
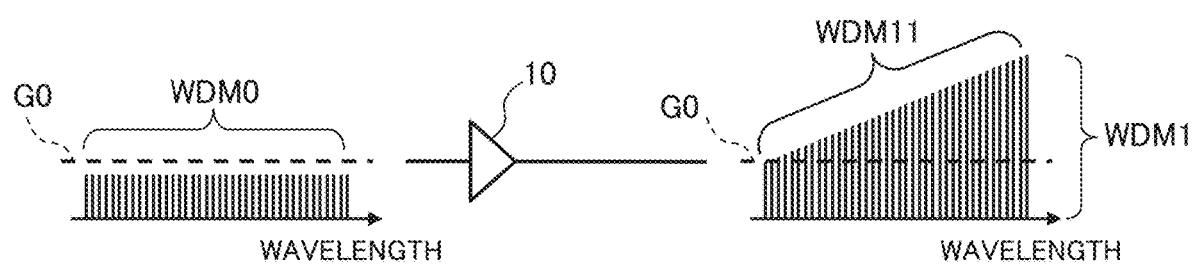
FIG. 9 is a diagram for describing a problem of a related light amplification device.

As schematically illustrated in FIG. 9, in the case of amplifying input wavelength division multiplexed signal light WDM0 by using a related optical amplifier 10 inserted into an optical transmission line, the related optical amplifier 10 is set in such a way that the wavelength division multiplexed signal light WDM0 is optically amplified in such a way as to meet gains exceeding a desired gain G0 even in the wavelength with the lowest signal gain. In wavelength division multiplexed signal light WDM1 amplified by the related optical amplifier 10, a portion (WDM11) with the gains exceeding the desired gain G0 is attenuated and equalized by the subsequent gain equalizer. However, the attenuation of the portion with the gains exceeding the desired gain G0 by the gain equalizer leads to an energy loss.

As described above, when the wavelength dependency of such a signal gain is reduced in the case of amplifying the wavelength division multiplexed signal light by using the optical amplifier, there has been a problem that there increases the inefficiency in use of the power supply resources.

An example advantage according to the invention is that, according to the light amplification device, the light transmission system, and the light amplification method of the present invention, in the case of amplifying the wavelength division multiplexed signal light by using the optical amplifier, the wavelength dependency of the signal gain can be reduced while increasing the utilization efficiency of the power supply resources.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A light amplification device comprising:
   a wavelength demultiplexing unit configured to receive wavelength division multiplexed signal light including a plurality of pieces of signal light different in wavelength, demultiplex the wavelength division multiplexed signal light into a plurality of wavelength bands, and output a plurality of pieces of demultiplexed multiplex signal light;
   a plurality of light amplification media configured to amplify each of the plurality of pieces of demultiplexed multiplex signal light, and output each of a plurality of pieces of amplified demultiplexed multiplex signal light;
a wavelength multiplexing unit configured to multiplex and output the amplified demultiplexed multiplex signal light;
a plurality of excitation energy supply units configured to supply excitation energy to each of the plurality of light amplification media; and
a control unit, wherein
the control unit includes a wavelength multiplexing/demultiplexing control unit configured to control the wavelength demultiplexing unit and the wavelength multiplexing unit in such a way that a starting wavelength serving as a starting point of the wavelength band and a wavelength number being a number of pieces of the signal light included in the wavelength band become an optimum starting wavelength and an optimum wavelength number that are the starting wavelength and the wavelength number when a sum of power consumption of the plurality of excitation energy supply units is minimized.

2. The light amplification device according to claim 1, wherein
the control unit includes
a lookup table configured to store, with respect to each modulation multi-level number of the signal light and each of the wavelength numbers, a relationship between the starting wavelength and power consumption of the excitation energy supply unit, the power consumption being necessary at a time of amplifying the demultiplexed multiplex signal light while causing the demultiplexed multiplex signal light to meet a required optical signal-to-noise ratio; and
a minimum power calculating unit configured to calculate the optimum starting wavelength and the optimum wavelength number with reference to the lookup table.

3. The light amplification device according to claim 2, further comprising a gain monitor unit configured to measure input light power of the demultiplexed multiplex signal light being input to the light amplification medium and output light power of the amplified demultiplexed multiplex signal light being output from the light amplification medium, and calculate, from the input light power and the output light power, a measured gain value being a gain of the light amplification medium, wherein
the control unit further includes an excitation energy control unit, and
the excitation energy control unit controls the excitation energy supply unit in such a way that the measured gain value is a gain value necessary for meeting an optical signal-to-noise ratio required for signal light with a wavelength in which a gain of the light amplification medium is minimum among the plurality of pieces of signal light.

4. The light amplification device according to claim 1, further comprising an information acquisition unit configured to acquire multiplexed signal light information including a multiplexed signal light starting wavelength serving as a starting point of a wavelength band of the wavelength division multiplexed signal light, a multiplexed signal light wavelength number being a number of wavelengths of the plurality of pieces of signal light, and an optical signal-to-noise ratio required for each of the plurality of pieces of signal light, and notify the control unit of the multiplexed signal light information, wherein
the control unit calculates the optimum starting wavelength and the optimum wavelength number, based on the multiplexed signal light information.

5. The light amplification device according to claim 1, wherein
each of the plurality of light amplification media includes a single-core optical fiber, and the single-core optical fiber includes a rare earth element in a core portion.

6. The light amplification device according to claim 1, wherein
the plurality of light amplification media include a multi-core optical fiber in which a plurality of core portions are each doped with a rare earth element.

7. A light transmission system comprising
a light relay device including a light amplification device, and
a network management device, wherein
the light amplification device includes
a wavelength demultiplexing unit configured to receive wavelength division multiplexed signal light including a plurality of pieces of signal light different in wavelength, demultiplex the wavelength division multiplexed signal light into a plurality of wavelength bands, and output a plurality of pieces of demultiplexed multiplex signal light;
a plurality of light amplification media configured to amplify each of the plurality of pieces of demultiplexed multiplex signal light, and output each of a plurality of pieces of amplified demultiplexed multiplex signal light;
a wavelength multiplexing unit configured to multiplex and output the amplified demultiplexed multiplex signal light;
a plurality of excitation energy supply units configured to supply excitation energy to each of the plurality of light amplification media; and
a control unit,
the control unit includes a wavelength multiplexing/demultiplexing control unit configured to control the wavelength demultiplexing unit and the wavelength multiplexing unit in such a way that a starting wavelength serving as a starting point of the wavelength band and a wavelength number being a number of pieces of the signal light included in the wavelength band become an optimum starting wavelength and an optimum wavelength number that are the starting wavelength and the wavelength number when a sum of power consumption of the plurality of excitation energy supply units is minimized, and
the network management device manages the plurality of pieces of signal light constituting the wavelength division multiplexed signal light in such a way that the pieces of signal light with a same modulation multi-level number are included in a same wavelength band.

8. The light transmission system according to claim 7, wherein
the network management device assigns signal light with the larger modulation multi-level number to a wavelength band with a larger gain of the light amplification medium, and assigns signal light with the smaller modulation multi-level number to a wavelength band with a smaller gain of the light amplification medium.

9. The light transmission system according to claim 7, wherein the network management device generates, with respect to each modulation multi-level number, multiplexed signal light information including a multiplexed signal light starting wavelength serving as a starting point of a wavelength band of the wavelength division multiplexed signal light, a multiplexed signal light wavelength number being a number of wavelengths of the plurality of pieces of signal light, and an optical signal-to-noise ratio required for each of the plurality of pieces of signal light, and notifies the light amplification device of the multiplexed signal light information with respect to each modulation multi-level number.

10. A light amplification method comprising:
receiving wavelength division multiplexed signal light including a plurality of pieces of signal light different in wavelength, demultiplexing the wavelength division multiplexed signal light into a plurality of wavelength bands, and generating a plurality of pieces of demultiplexed multiplex signal light;
amplifying each of the plurality of pieces of demultiplexed multiplex signal light by a plurality of light amplification media, and generating each of a plurality of amplified demultiplexed multiplex signal light;
multiplexing the amplified demultiplexed multiplex signal light;
supplying excitation energy to each of the plurality of light amplification media; and
demultiplexing the wavelength division multiplexed signal light into the plurality of wavelength bands in such a way that a starting wavelength serving as a starting point of the wavelength band and a wavelength number being a number of pieces of the signal light included in the wavelength band become an optimum starting wavelength and an optimum wavelength number that are the starting wavelength and the wavelength number when a sum of power consumption during generation of the excitation energy is minimized.

11. The light amplification method according to claim 10, wherein,
at a time of demultiplexing the wavelength division multiplexed signal light into the plurality of wavelength bands, the optimum starting wavelength and the optimum wavelength number are calculated with reference to a lookup table, and
the lookup table stores, with respect to each modulation multi-level number of the signal light and each of the wavelength numbers, a relationship between the starting wavelength and power consumption during generation of the excitation energy, the power consumption being necessary at a time of amplifying the demultiplexed multiplex signal light while causing the demultiplexed multiplex signal light to meet a required optical signal-to-noise ratio.

12. The light amplification method according to claim 11, further comprising:
measuring input light power of the demultiplexed multiplex signal light being input to the light amplification medium and output light power of the amplified demultiplexed multiplex signal light being output from the light amplification medium;
calculating, from the input light power and the output light power, a measured gain value being a gain of the light amplification medium; and
generating the excitation energy in such a way that the measured gain value is a gain value necessary for meeting an optical signal-to-noise ratio required for signal light with a wavelength in which a gain of the light amplification medium is minimum among the plurality of pieces of signal light.

13. The light amplification method according to claim 10, further comprising:
acquiring multiplexed signal light information including a multiplexed signal light starting wavelength serving as a starting point of a wavelength band of the wavelength division multiplexed signal light, a multiplexed signal light wavelength number being a number of wavelengths of the plurality of pieces of signal light, and an optical signal-to-noise ratio required for each of the plurality of pieces of signal light; and
calculating the optimum starting wavelength and the optimum wavelength number, based on the multiplexed signal light information.

14. The light amplification device according to claim 1, wherein
each of the wavelength demultiplexing unit and the wavelength multiplexing unit is one of a wavelength selective switch and an arrayed-waveguide grating, and the excitation energy supply unit includes a semiconductor laser.

15. The light amplification device according to claim 2, further comprising an information acquisition unit configured to acquire multiplexed signal light information including a multiplexed signal light starting wavelength serving as a starting point of a wavelength band of the wavelength division multiplexed signal light, a multiplexed signal light wavelength number being a number of wavelengths of the plurality of pieces of signal light, and an optical signal-to-noise ratio required for each of the plurality of pieces of signal light, and notify the control unit of the multiplexed signal light information, wherein
the control unit calculates the optimum starting wavelength and the optimum wavelength number, based on the multiplexed signal light information.

16. The light amplification device according to claim 3, further comprising an information acquisition unit configured to acquire multiplexed signal light information including a multiplexed signal light starting wavelength serving as a starting point of a wavelength band of the wavelength division multiplexed signal light, a multiplexed signal light wavelength number being a number of wavelengths of the plurality of pieces of signal light, and an optical signal-to-noise ratio required for each of the plurality of pieces of signal light, and notify the control unit of the multiplexed signal light information, wherein
the control unit calculates the optimum starting wavelength and the optimum wavelength number, based on the multiplexed signal light information.

17. The light amplification device according to claim 2, wherein
each of the plurality of light amplification media includes a single-core optical fiber, and the single-core optical fiber includes a rare earth element in a core portion.

18. The light amplification device according to claim 2, wherein
the plurality of light amplification media include a multi-core optical fiber in which a plurality of core portions are each doped with a rare earth element.

19. The light transmission system according to claim 7, wherein
the control unit includes
a lookup table configured to store, with respect to each modulation multi-level number of the signal light and each of the wavelength numbers, a relationship between the starting wavelength and power consumption of the excitation energy supply unit, the power consumption being necessary at a time of amplifying the demultiplexed multiplex signal light while causing the demultiplexed multiplex signal light to meet a required optical signal-to-noise ratio; and a minimum power calculating unit configured to calculate the optimum starting wavelength and the optimum wavelength number with reference to the lookup table.

20. The light transmission system according to claim 19, further comprising a gain monitor unit configured to measure input light power of the demultiplexed multiplex signal light being input to the light amplification medium and output light power of the amplified demultiplexed multiplex signal light being output from the light amplification medium, and calculate, from the input light power and the output light power, a measured gain value being a gain of the light amplification medium, wherein the control unit further includes an excitation energy control unit, and the excitation energy control unit controls an excitation energy supply unit in such a way that the measured gain value is a gain value necessary for meeting an optical signal-to-noise ratio required for signal light with a wavelength in which a gain of the light amplification medium is minimum among the plurality of pieces of signal light.

* * * * *